US008494721B2

(12) United States Patent
Takahashi et al.

(10) Patent No.: US 8,494,721 B2
(45) Date of Patent: Jul. 23, 2013

(54) VEHICLE INTEGRATED CONTROL APPARATUS

(75) Inventors: Naoki Takahashi, Anjo (JP); Shunsuke Matsuo, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/454,779

(22) Filed: Apr. 24, 2012

(65) Prior Publication Data

US 2012/0271516 A1 Oct. 25, 2012

(30) Foreign Application Priority Data

Apr. 25, 2011 (JP) ................................ 2011-096939
Mar. 6, 2012 (JP) ................................ 2012-048826

(51) Int. Cl.
*B62D 6/00* (2006.01)

(52) U.S. Cl.
USPC .............................................. 701/42; 701/41

(58) Field of Classification Search
USPC ..................................................... 701/42, 41
See application file for complete search history.

(56) References Cited

U.S. PATENT DOCUMENTS 5,398,953 A * 3/1995 Shimizu ........................ 180/446
7,337,873 B2 * 3/2008 Aizawa et al. ................ 180/446
7,902,693 B2 * 3/2011 Hijikata et al. .............. 307/10.1
7,997,373 B2 * 8/2011 Yasui et al. ................... 180/197
8,116,942 B2 * 2/2012 Yasui et al. ...................... 701/41
2005/0205339 A1 * 9/2005 Aizawa et al. ................ 180/443
2006/0100766 A1 * 5/2006 Schwarz et al. ................ 701/71
2008/0119988 A1 * 5/2008 Yasui et al. ...................... 701/41
2009/0043443 A1 * 2/2009 Wei et al. ......................... 701/29
2009/0095562 A1 * 4/2009 Yasui et al. ................... 180/412
2011/0208392 A1 * 8/2011 Kodaira et al. ................. 701/41
2012/0199414 A1 * 8/2012 Shimizu et al. ............... 180/446

FOREIGN PATENT DOCUMENTS

EP 2174857 A1 * 4/2010
JP 3401336 B2 2/2003
JP 3401336 B2 * 4/2003
WO WO 2009044784 A1 * 4/2009

* cited by examiner

*Primary Examiner* — Mary Cheung
*Assistant Examiner* — Michael Berns
(74) *Attorney, Agent, or Firm* — Birch, Stewart, Kolasch & Birch, LLP

(57) ABSTRACT

A vehicle integrated control apparatus includes: an electronic control type right/left wheel differential limiting mechanism; a restraining torque proportional controlling unit calculating a first steering assisting force being proportional to a control amount of a restraining torque of the right and left front wheels and being in a direction according to a rotational speed difference between right and left front wheels; a steering reaction force feedback controlling unit calculating a second steering assisting force corresponding to a steering system reaction force and being in a direction along which the steering system reaction force is canceled; and a switching unit changing a ratio of the first and second steering assisting forces in a steering assisting force to be generated, in accordance with the rotational speed difference.

8 Claims, 12 Drawing Sheets

CONTROLLER
STEERING ECU
BRAKE SYSTEM ECU
CONTROL SYSTEM ECU
1
11
12
13
14
21
22
31
32
33
34
41
42
43
44
51
61
62
63
64
71
72
73
81
82
83
84
90
91

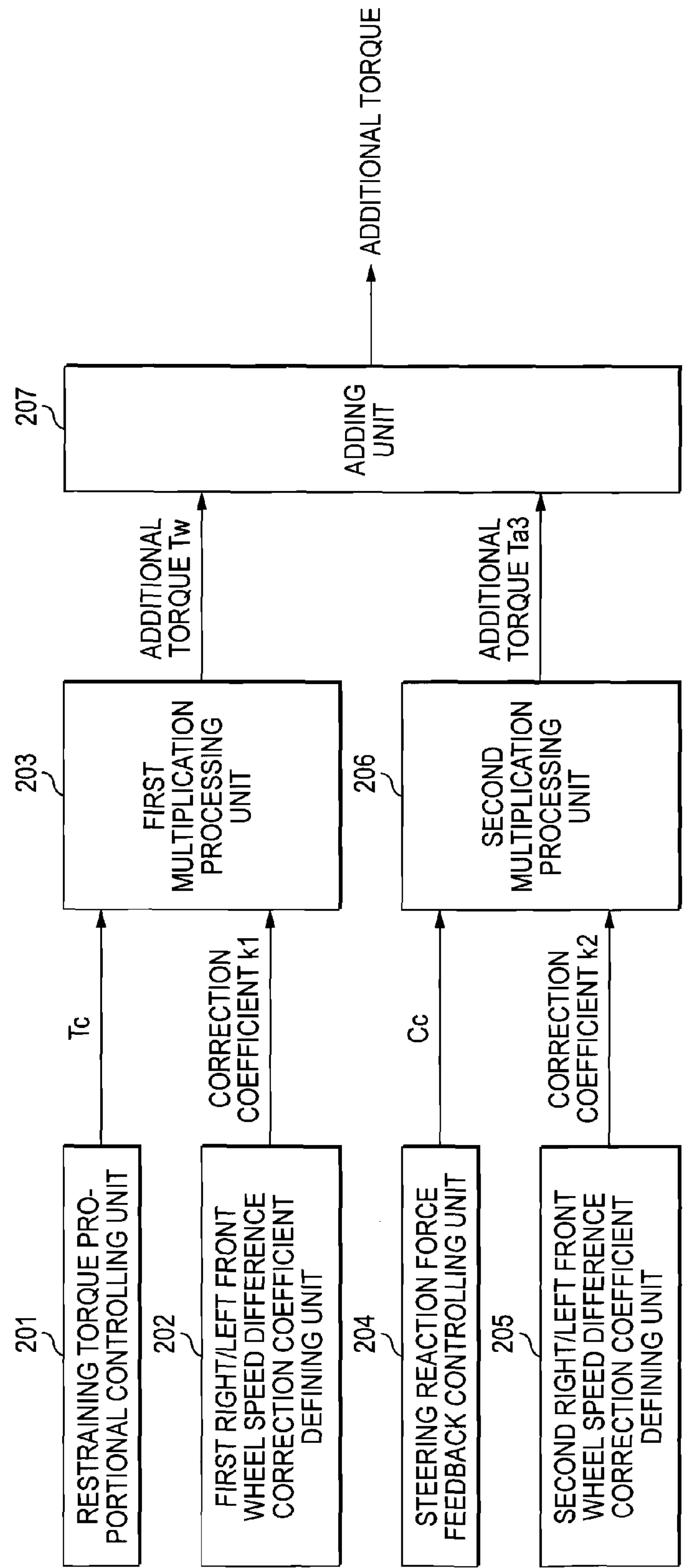
FIG. 2
201
RESTRAINING TORQUE PRO-PORTIONAL CONTROLLING UNIT
202
FIRST RIGHT/LEFT FRONT WHEEL SPEED DIFFERENCE CORRECTION COEFFICIENT DEFINING UNIT
204
STEERING REACTION FORCE FEEDBACK CONTROLLING UNIT
205
SECOND RIGHT/LEFT FRONT WHEEL SPEED DIFFERENCE CORRECTION COEFFICIENT DEFINING UNIT
Tc
CORRECTION COEFFICIENT k1
Cc
CORRECTION COEFFICIENT k2
203
FIRST MULTIPLICATION PROCESSING UNIT
206
SECOND MULTIPLICATION PROCESSING UNIT
ADDITIONAL TORQUE Tw
ADDITIONAL TORQUE Ta3
207
ADDING UNIT
ADDITIONAL TORQUE

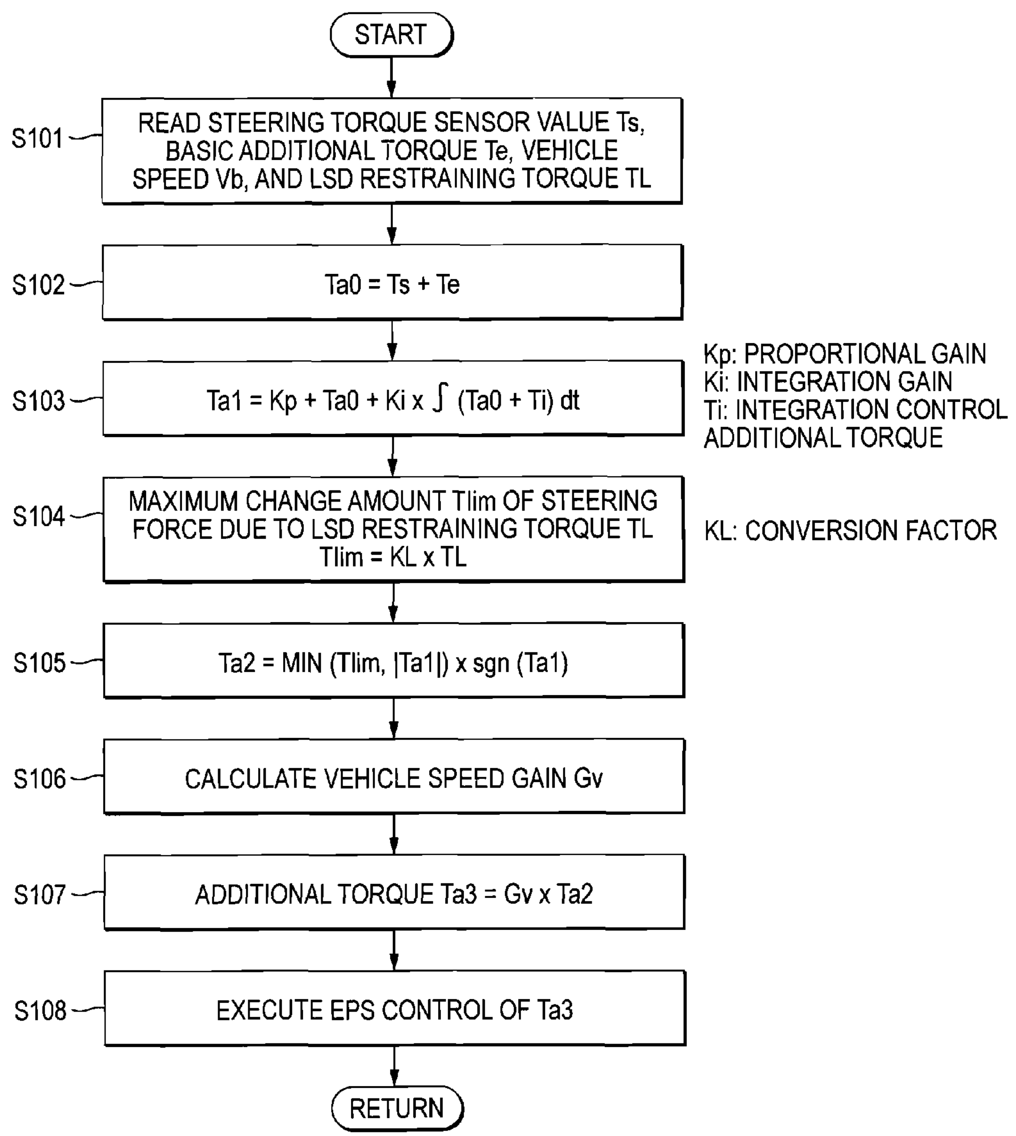
FIG. 7
START
S101
READ STEERING TORQUE SENSOR VALUE Ts, BASIC ADDITIONAL TORQUE Te, VEHICLE SPEED Vb, AND LSD RESTRAINING TORQUE TL
S102
Ta0 = Ts + Te
S103
Ta1 = Kp + Ta0 + Ki x ∫ (Ta0 + Ti) dt
Kp: PROPORTIONAL GAIN
Ki: INTEGRATION GAIN
Ti: INTEGRATION CONTROL ADDITIONAL TORQUE
S104
MAXIMUM CHANGE AMOUNT Tlim OF STEERING FORCE DUE TO LSD RESTRAINING TORQUE TL
Tlim = KL x TL
KL: CONVERSION FACTOR
S105
Ta2 = MIN (Tlim, |Ta1|) x sgn (Ta1)
S106
CALCULATE VEHICLE SPEED GAIN Gv
S107
ADDITIONAL TORQUE Ta3 = Gv x Ta2
S108
EXECUTE EPS CONTROL OF Ta3
RETURN

VEHICLE INTEGRATED CONTROL APPARATUS

BACKGROUND OF THE INVENTION

1. Field of the Invention

The present invention relates to a vehicle integrated control apparatus which suppresses a phenomenon of uncontrollable steering caused by a steering torque change during a vehicle traveling in situations where the vehicle attitude becomes unstable, such as the case where a right/left-wheel differential limiting mechanism operates on a rough road in which the road surface friction coefficients of the right and left front wheels are different from each other, thereby improving the traveling performance and stability of a vehicle.

2. Description of the Related Art

In the field of a power steering system of a vehicle, recently, as an aid to the steering torque caused by a steering operation by the driver, an electric power steering system has been employed that is a steering assisting mechanism which can control a steering force by adding a steering assisting force imparted by the force of an electric motor, to the steering operation.

In such an electric power steering system, a friction is larger because of the resistance of the electric motor and the like as compared with a hydraulic power steering system or the like, and the steering is hardly returned to a neutral position. Therefore, a technique has been proposed in which, during a steering operation, an electric power steering system is controlled by using the right/left-wheel speed difference between the steered wheels so that a steering assisting force is added in the direction of returning the steering to the neutral position.

In a vehicle which includes a right/left-wheel differential limiting mechanism in order to improve the traveling performance of the vehicle, in the case where the right/left-wheel differential limiting mechanism operates during turning traveling, traveling on a μ-split road in which right and left tires receive different road surface frictions, or the like, uncontrollable steering occurs, and there is a fear that the driver might have a feeling of strangeness during a steering operation.

As a steering force control mechanism in a vehicle using such a right/left-wheel differential limiting mechanism, proposed is an apparatus in which an electric power steering system functioning as a steering assisting mechanism is controlled in accordance with a restraining torque produced when the right/left-wheel differential limiting mechanism operates, and the occurrence of the phenomenon of uncontrollable steering caused by a steering torque change is suppressed so that the driver's feeling of strangeness during a steering operation is eliminated (see Japanese Patent No. 3,401,336).

However, an actual steering torque change is proportional not to the restraining torque of a right/left-wheel differential limiting mechanism, but to the driving force difference between the right and left wheels. When a control which is proportional to the restraining torque of a right/left-wheel differential limiting mechanism is performed as in the above-described prior art, therefore, the control amount becomes excessive or insufficient. In a state where the right/left-wheel differential limiting mechanism is locked, i.e., where the right and left wheels are directly coupled with each other, the direction and degree of a steering torque change are not known, and, for example, it is difficult to perform a control based on an electric power steering apparatus which is a steering assist apparatus. Therefore, there is a problem in that the proposed apparatus is insufficient to eliminate the driver's feeling of strangeness during a steering operation.

In a usual mechanical right/left-wheel differential limiting mechanism, moreover, it is difficult to estimate a steering torque change. At the same time, a steering torque change is hardly suppressed by an electric power steering system.

On the other hand, when assuming an electronic right/left-wheel differential limiting mechanism which can freely control the restraining torque of the right/left-wheel differential limiting mechanism, a steering torque change can be accurately estimated by applying a control logic for the right/left-wheel differential limiting mechanism which can easily estimate a steering torque change due to the right/left-wheel differential limiting mechanism.

SUMMARY OF THE INVENTION

It is therefore an object of the invention to provide a vehicle integrated control apparatus which can accurately suppress a steering torque change due to an operation of a right/left-wheel differential limiting mechanism, which can eliminate the driver's feeling of strangeness during a steering operation, and which can safely realize powerful starting even on a slippery road surface.

In order to achieve the object, according to the invention, there is provided a vehicle integrated control apparatus comprising: an electronic control type right/left wheel differential limiting mechanism configured to control a restraining torque of right and left front wheels; a wheel speed difference detecting unit configured to detect a rotational speed difference between the right and left front wheels; a restraining torque proportional controlling unit configured to calculate a first steering assisting force that is proportional to a control amount of the restraining torque of the right/left-wheel differential limiting mechanism and that is in a direction according to the rotational speed difference between the right and left front wheels detected by the wheel speed difference detecting unit; a steering reaction force feedback controlling unit configured to calculate a second steering assisting force that corresponds to a steering system reaction force and that is in a direction along which the steering system reaction force is canceled; a steering force controlling mechanism configured to generate a steering assisting force including the first steering assisting force and the second steering assisting force; and a switching unit configured to change a ratio of the first steering assisting force and the second steering assisting force in the steering assisting force, in accordance with the rotational speed difference between the right and left front wheels.

BRIEF DESCRIPTION OF THE DRAWINGS

FIG. 2 is a block diagram showing the configuration of the vehicle integrated control apparatus of the first embodiment of the invention.

FIG. 7 is a flowchart showing an operation in the case where an example of a steering reaction force feedback control in the vehicle integrated control apparatus of the first embodiment of the invention is realized by software.

DETAILED DESCRIPTION OF THE INVENTION EMBODIMENTS

First Embodiment

Hereinafter, a first embodiment of the invention will be described.

Figure 1:
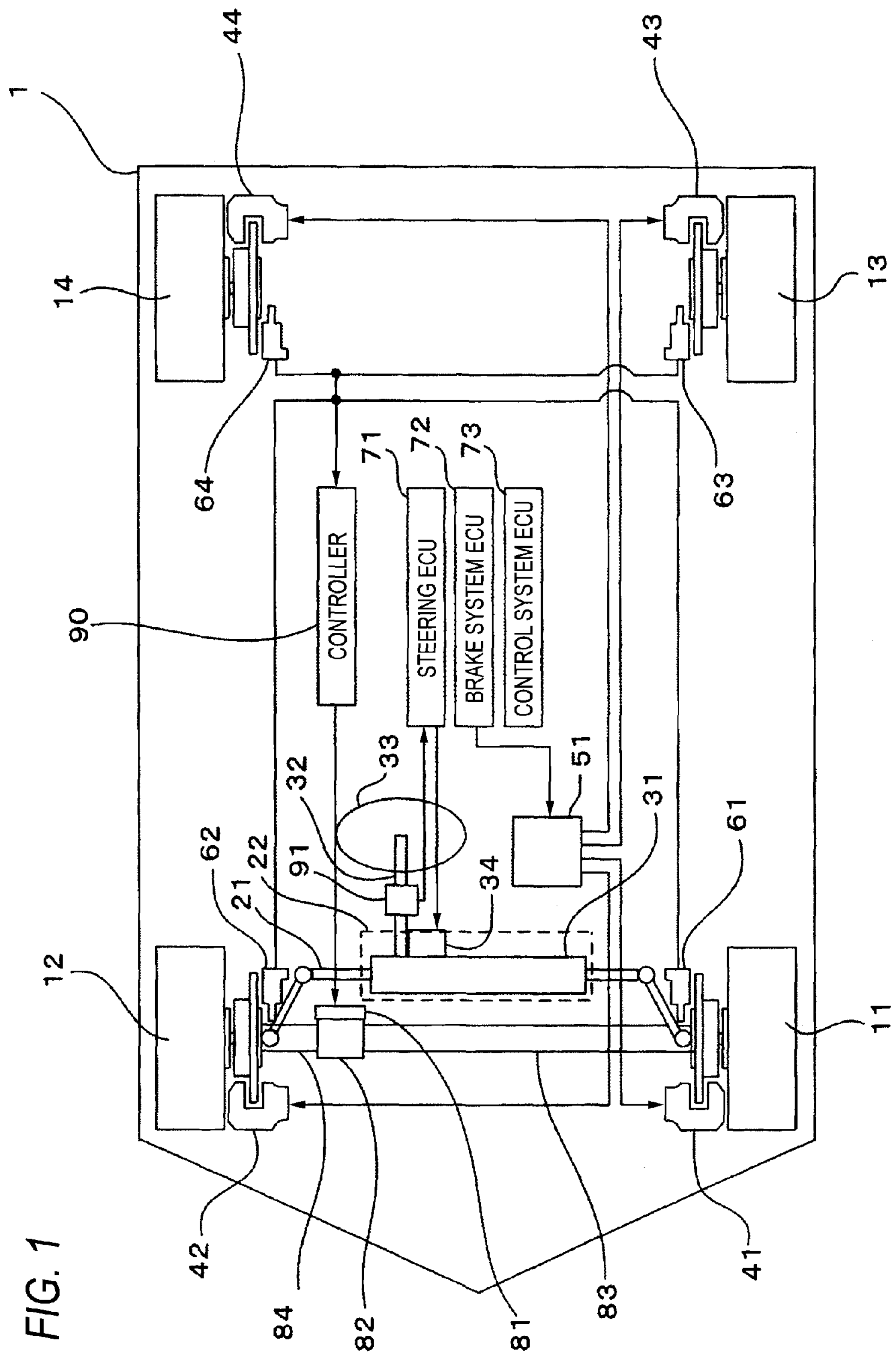
FIG. 1 is a schematic diagram showing the configuration of a vehicle including a vehicle integrated control apparatus of a first embodiment of the invention.

FIG. 1 is a schematic diagram showing the configuration of a vehicle 1 including a vehicle integrated control apparatus of the embodiment.

Referring to FIG. 1, the vehicle 1 includes a left front wheel 11, a right front wheel 12, a left rear wheel 13, and a right rear wheel 14.

The left front wheel 11 and the right front wheel 12 are steered wheels of the vehicle 1, and coupled to an electric power steering apparatus 22 through tie rods 21.

The electric power steering apparatus (steering force control mechanism) 22 includes a steering gear box 31, a steering shaft 32, a steering wheel 33, and an electric motor 34.

The steering wheel 33 is coupled to the steering gear box 31 through the steering shaft 32.

An operation by the driver on the steering wheel 33 is transmitted to the steering gear box 31 through the steering shaft 32.

Then, the tie rods 21 are operated through the steering gear box 31 to change the directions of the left front wheel 11 and the right front wheel 12.

In other words, the steering system which steers the steered wheels (the left front wheel 11 and the right front wheel 12) includes the steering gear box 31, the steering shaft 32, and the steering wheel 33.

The electric motor 34 is disposed in the steering gear box 31. The rotation of the electric motor 34 is input to the steering gear box 31 to generate a steering assisting force with respect to the operation of the steering wheel 33.

Namely, the steering assisting force is added to the steering system by the electric motor 34.

A steering torque sensor 91 detects the steering torque due to a steering operation performed by the driver, and is attached to the steering shaft 32.

Brakes 41, 42, 43, 44 which impart a braking force to respective wheels are disposed in the left front wheel 11, the right front wheel 12, the left rear wheel 13, and the right rear wheel 14, respectively.

The brake 41 imparts a braking force to the left front wheel 11, the brake 42 imparts a braking force to the right front wheel 12, the brake 43 imparts a braking force to the left rear wheel 13, and the brake 44 applies a braking force to the right rear wheel 14.

In the brakes 41 to 44, the braking forces to be applied to the left front wheel 11, the right front wheel 12, the left rear wheel 13, and the right rear wheel 14 are controlled by a hydraulic pressure supplied from a brake hydraulic pressure unit 51 mounted on the vehicle.

Wheel speed sensors 61-64 which detect the wheel speeds of the respective wheels are disposed in the left front wheel 11, the right front wheel 12, the left rear wheel 13, and the right rear wheel 14, respectively.

A wheel speed sensor 61 detects the wheel speed (rotation number) of the left front wheel 11, a wheel speed sensor 62 detects the wheel speed (rotation number) of the right front wheel 12, a wheel speed sensor 63 detects the wheel speed (rotation number) of the left rear wheel 13, and a wheel speed sensor 64 detects the wheel speed (rotation number) of the right rear wheel 14.

Driving forces are transmitted respectively to the left front wheel 11 and the right front wheel 12 through a front differential 82 including a right/left-wheel differential limiting mechanism 81. The left front wheel 11 is coupled to a driving shaft 83, and the right front wheel 12 is coupled to a driving shaft 84. The left front wheel 11 and the right front wheel 12 are driven and rotated by the driving forces which are transmitted to the driving shafts 83, 84 through the front differential 82 including the right/left-wheel differential limiting mechanism 81, respectively.

The right/left-wheel differential limiting mechanism 81 is an electronic control type right/left front wheel differential limiting mechanism which can freely control the restraining torque. The right/left-wheel differential limiting mechanism 81 generates a torque which restrains the relative rotation of the right and left driving shafts 84, 83 in accordance with the engagement state of an incorporated electromagnetic clutch which is not shown, thereby causing a differential limiting force to act between the left front wheel 11 and the right front wheel 12.

A controller 90 controls the engagement state of the electromagnetic clutch by adjusting the exciting current, thereby controlling the restraining torque generated by the right/left-wheel differential limiting mechanism 81. The controller 90 executes a restraining torque proportional control for calculating: the rotational speed difference of the right and left front wheels from the wheel speeds that are detected by the wheel speed sensors 61, 62, and that are input through communication with a brake system ECU 72; and a proportional steering assisting force that is proportional to the restraining torque due to the right/left-wheel differential limiting mechanism 81, and that is in the direction according to the rotational speed difference. The controller 90 further executes a steering reaction force feedback control for calculating a reaction force cancellation steering assisting force, which is in a direction along which the steering system reaction force is canceled, based on: a steering torque sensor value Ts that is detected by the steering torque sensor 91, and that is input through communication with a steering ECU 71; a steering assist torque Te that is caused by the electric motor 34 of the electric power steering apparatus 22; the restraining torque that is caused by the right/left-wheel differential limiting mechanism 81; and the like. The controller 90 instructs the steering ECU 71 through communication so that the electric power steering apparatus (steering force control mechanism) 22 generates these steering assisting forces, thereby realizing an attitude stabilizing control in which a steering torque change due to the operation of the right/left-wheel differential limiting mechanism 81 can be accurately suppressed, the driver's feeling of strangeness during a steering operation can be eliminated, and the traveling performance and the stability are improved.

The steering ECU 71 has, as a steering force control function, a basic function of adding the steering assisting force which is generated by the electric power steering apparatus 22 in order to reduce the steering torque by the driver, to the steering system by the electric motor 34. The steering ECU controls the electric power steering apparatus (steering force control mechanism) 22 in the embodiment through communication with the controller 90.

In the brake system ECU 72, the ABS (Anti-lock Brake System) function which operates in braking of the vehicle 1 is realized by controlling the brake hydraulic pressure unit 51.

According to the ABS function which is realized by the brake system ECU 72, based on the wheel speeds detected by the wheel speed sensors 61 to 64, the locking states of the wheels during sudden braking of the vehicle 1 or on a low-μ road surface are detected, and the brake hydraulic pressure unit 51 is controlled so that the optimum braking forces are imparted to the wheels by the brakes 41 to 44 while avoiding the locking states.

A control system ECU 73 performs an efficient engine control.

The controller 90, the steering ECU 71, the brake system ECU 72, and the control system. ECU 73 are formed as a computer, and configured by storage devices such as a RAM and a ROM, a central processing unit, a timer, input/output devices such as I/O ports, various interfaces, etc. The wheel speed sensors 61 to 64 are connected to the brake system ECU 72 through the input/output devices.

The vehicle includes a communication function of transmitting and receiving various data among the controller 90, the steering ECU 71, the brake system ECU 72, and the control system ECU 73.

FIG. 2 is a block diagram showing the configuration of the vehicle integrated control apparatus of the embodiment. The vehicle integrated control apparatus shown in FIG. 2 is configured in the controller 90, and executes software programs stored in the storage devices of the controller 90 to calculate an additional torque which is to be instructed to the steering ECU 71.

As shown in FIG. 2, the vehicle integrated control apparatus includes a restraining torque proportional controlling unit 201, a first right/left front wheel speed difference correction coefficient defining unit 202, a first multiplication processing unit 203, a steering reaction force feedback controlling unit 204, a second right/left front wheel speed difference correction coefficient defining unit 205, a second multiplication processing unit 206, and an adding unit 207.

The restraining torque proportional controlling unit 201 calculates an additional torque Tc which is the proportional steering assisting force that is proportional to a control amount of the restraining torque. A mode is assumed where the LSD restraining force is weak and a right/left front wheel speed difference occurs between the right and left front wheels.

The first right/left front wheel speed difference correction coefficient defining unit (first correction coefficient defining unit) 202 sets a correction coefficient k1 which corrects the additional torque Tc based on the right/left front wheel speed difference and which has a sign in the direction corresponding to the right/left front wheel speed difference.

Figure 3:
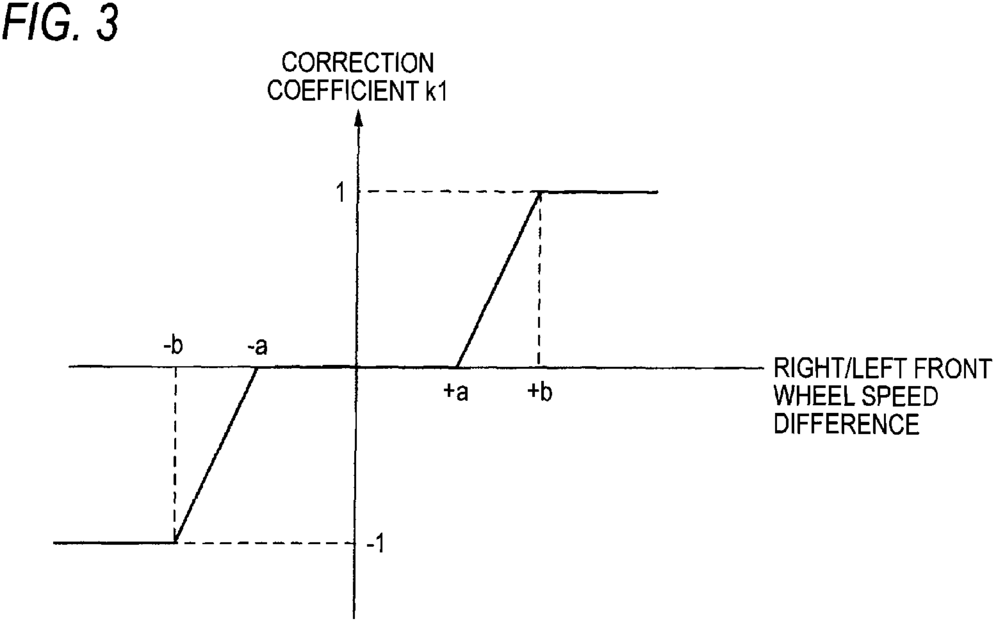
FIG. 3 is a view illustrating characteristics of a correction coefficient k1 in the vehicle integrated control apparatus of the first embodiment of the invention.

FIG. 3 is a view illustrating characteristics of the correction coefficient k1. The correction coefficient k1 has characteristics in which the coefficient is zero in a range where the right/left front wheel speed difference is ±a, changed from zero to +1 at a constant gradient in a range where the right/left front wheel speed difference is from +a to +b, and is +1 in a range where the right/left front wheel speed difference exceeds +b (the right/left front wheel speed difference is equal to or greater than +b, or is greater than +b), and characteristics in which the coefficient is changed from zero to −1 at the same gradient as the above-described gradient in a range where the right/left front wheel speed difference is from −a to −b, and is −1 in a range where the right/left front wheel speed difference exceeds −b (the right/left front wheel speed difference is equal to or less than −b, or is less than −b).

The first multiplication processing unit (first correcting unit) 203 performs a multiplication process for performing a correction by using the correction coefficient k1 set by the first right/left front wheel speed difference correction coefficient defining unit 202, on the additional torque Tc which is calculated by executing the restraining torque proportional control in the restraining torque proportional controlling unit 201, i.e., a calculation of (the additional torque Tc×the correction coefficient k1), and outputs the corrected additional torque which is the additional torque Tc corrected with the correction coefficient k1, as an additional torque Tw pertaining to the restraining torque proportional control.

The steering reaction force feedback controlling unit 204 calculates a steering system reaction force, and calculates an additional torque Cc which is the reaction force cancellation steering assisting force that cancels the steering system reaction force. A locking mode where the LSD restraining force is strong is assumed.

The second right/left front wheel speed difference correction coefficient defining unit (second correction coefficient defining unit) 205 sets a correction coefficient k2 for correcting the additional torque Cc based on the right/left front wheel speed difference.

Figure 4:
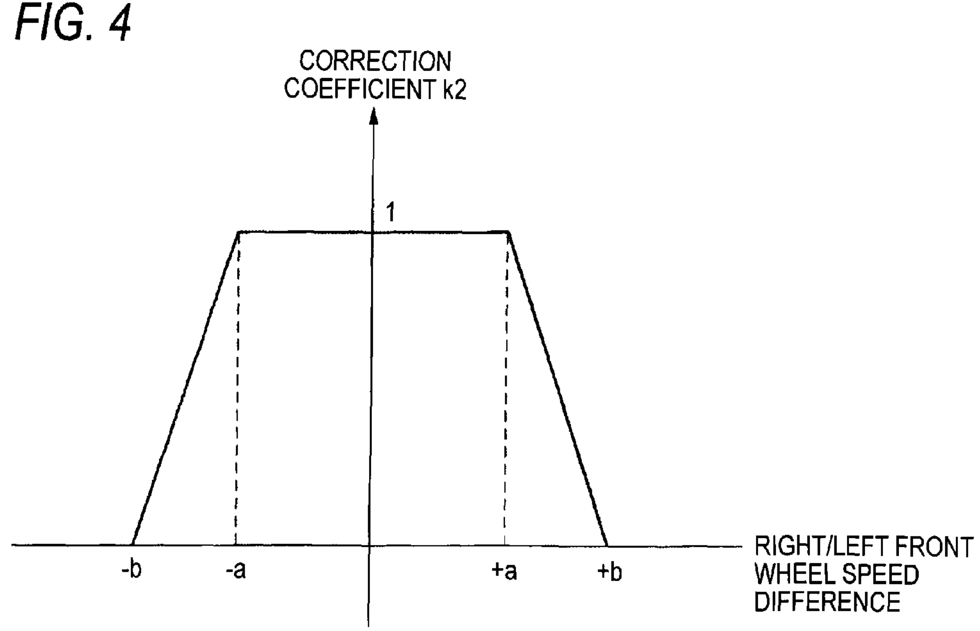
FIG. 4 is a view illustrating characteristics of a correction coefficient k2 in the vehicle integrated control apparatus of the first embodiment of the invention.

FIG. 4 is a view illustrating characteristics of the correction coefficient k2. The correction coefficient k2 has characteristics in which the coefficient is +1 in a range where the right/left front wheel speed difference is ±a, changed from +1 to zero at a constant gradient in a range where the right/left front wheel speed difference is from +a to +b, and is zero in a range where the right/left front wheel speed difference exceeds +b (the right/left front wheel speed difference is equal to or greater than +b, or is greater than +b), and characteristics in which the coefficient is changed from +1 to zero at the gradient of the polarity opposite to that of the above-described gradient, in a range where the right/left front wheel speed difference is from −a to −b, and is zero in a range where the right/left front wheel speed difference exceeds −b (the right/left front wheel speed difference is equal to or less than −b, or is less than −b). Namely, the characteristics of the correction coefficient k2 are in an opposite phase relationship relative to those of the correction coefficient k1. Moreover, the additional torque Cc is corrected with the characteristics of the correction coefficient k2 which are in an opposite phase relationship relative to those of the correction coefficient k1.

The second multiplication processing unit (second correcting unit) 206 performs a multiplication process for performing a correction by using the correction coefficient k2 set by the second right/left front wheel speed difference correction coefficient defining unit 205, on the additional torque Cc which is calculated by the steering reaction force feedback control of the steering reaction force feedback controlling unit 204, i.e., a calculation of (the additional torque Cc×the correction coefficient k2), and outputs the corrected additional torque which is the additional torque Cc corrected with the correction coefficient k2, as an additional torque Ta3 pertaining to the steering reaction force feedback control.

The adding unit 207 performs a process of adding the additional torque Tw which is corrected with the correction coefficient k1 and which pertains to the restraining torque proportional control, to the additional torque Ta3 which is corrected with the correction coefficient k2 and which pertains to the steering reaction force feedback control, and outputs an additional torque configured by: the additional torque Tw which is weighted by the correction coefficient k1 and which pertains to the restraining torque proportional control; and the additional torque Ta3 which is weighted by the correction coefficient k2 and which pertains to the steering reaction force feedback control. Namely, in the steering assisting force to be generated by the electric power steering apparatus 22, the ratio of the steering assisting force which is the proportional steering assisting force, and that which is the reaction force cancellation steering assisting force is changed in accordance with the right/left front wheel speed difference between the right and left front wheels.

The additional torque is instructed to the steering ECU 71, and the electric motor 34 is controlled through an interface (not shown) to generate a steering assisting force with respect to the operation on the steering wheel 33.

In the attitude stabilizing control, in the case of a specific driving situation where the attitude of the vehicle 1 is unstable, when the right/left-wheel differential limiting mechanism 81 operates, a steering torque change due to the operation of the right/left-wheel differential limiting mechanism 81 is accurately estimated, and the driver's feeling of strangeness during a steering operation is eliminated.

In the ABS function of the brake system ECU 72, the slip ratios of the left front wheel 11, the right front wheel 12, the left rear wheel 13, and the right rear wheel 14 are calculated from the wheel speeds detected by the wheel speed sensors 61 to 64, and the hydraulic pressures which are to be supplied from the brake hydraulic pressure unit 51 to the brakes 41 to 44 are controlled so that the calculated slip ratios have respective optimum values.

Figure 5A:
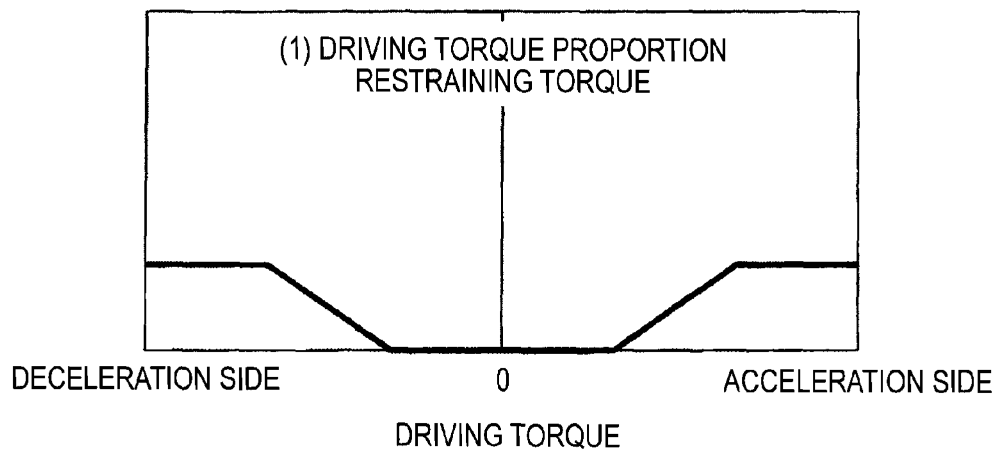
FIG. 5 is a characteristic diagram showing a driving torque proportional control and rotational speed difference proportional control which are used for calculating a restraining torque TL in a right/left-wheel differential limiting mechanism in the embodiment of the invention.
Figure 5B:
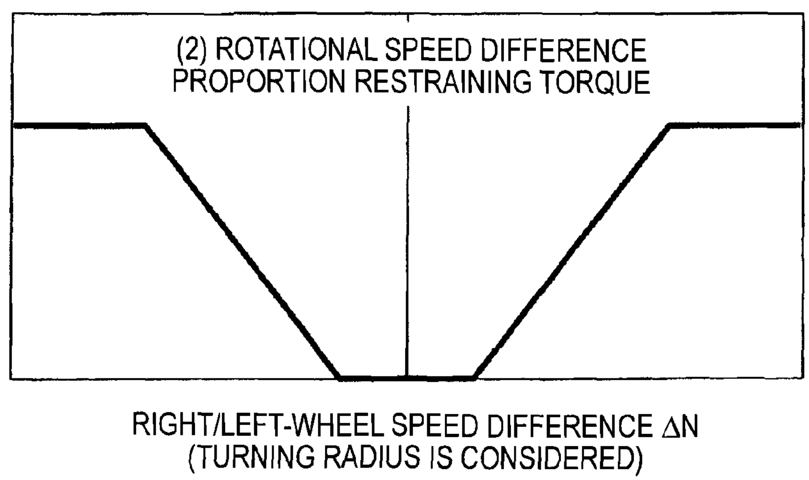

FIG. 5 is a characteristic diagram showing a driving torque proportional control and rotational speed difference proportional control which are used for calculating a restraining torque TL in the right/left-wheel differential limiting mechanism 81 that is switched in the vehicle integrated control apparatus of the embodiment. The restraining torque due to the driving torque proportional control is calculated in proportion to the driving torque of an engine, and the restraining torque due to the rotational speed difference proportional control is calculated in proportion to the rotational speed difference between the right/left front wheels. The restraining torque TL in the right/left-wheel differential limiting mechanism 81 is calculated as the total output value of the restraining torque due to the driving torque proportional control and the restraining torque due to the rotational speed difference proportional control. The data of the characteristic diagrams of FIGS. 5A and 5B are disposed in the controller 90 in the form of maps of a driving torque proportion restraining torque (FIG. 5A) and that of a rotational speed difference proportion restraining torque (FIG. 5B).

Next, the operation will be described.

In the embodiment, the ratio of: the proportional steering assisting force due to the restraining torque proportional control which is an additional torque that is proportional to the control amount of the restraining torque and that is in the direction according to the right/left front wheel speed difference; and the reaction force cancellation steering assisting force due to the steering reaction force feedback control which is an additional torque that cancels the steering system reaction force and that is in the direction along which the steering system reaction force is canceled, is changed in accordance with the right/left front wheel speed difference.

That is, in the case where the right/left front wheel speed difference is produced, the restraining torque proportional control is suitable, and, in the case where the right/left front wheel speed difference is not produced, the steering reaction force feedback control is suitable.

Therefore, a range where the right/left front wheel speed difference is produced, and that where the right/left front wheel speed difference is not produced are defined by a threshold. Then, the ratio of the proportional steering assisting force due to the restraining torque proportional control, and the reaction force cancellation steering assisting force due to the steering reaction force feedback control is changed depending on to which one of the ranges the detected right/left front wheel speed difference belongs.

Alternatively, the weighting of the proportional steering assisting force due to the restraining torque proportional control, and that of the reaction force cancellation steering assisting force due to the steering reaction force feedback control are changed, and the ratio of the proportional steering assisting force due to the restraining torque proportional control, and the reaction force cancellation steering assisting force due to the steering reaction force feedback control is smoothly changed.

As a result, a steering torque change due to the operation of the right/left-wheel differential limiting mechanism is accurately suppressed, the driver's feeling of strangeness during a steering operation is eliminated, and powerful starting is safely realized even on a slippery road surface.

Hereinafter, the operation of the vehicle integrated control apparatus of the embodiment will be described with reference to FIG. 2.

In the vehicle integrated control apparatus, the additional torque Tc calculated by the restraining torque proportional controlling unit 201 is corrected with the correction coefficient k1 which is set by the first right/left front wheel speed difference correction coefficient defining unit 202, and, in the case where the right/left front wheel speed difference is increased in a positive direction to exceed +b (the right/left front wheel speed difference is equal to or greater than +b, or is greater than +b), or the right/left front wheel speed difference is increased in a negative direction to exceed −b (the right/left front wheel speed difference is equal to or less than −b, or is less than −b), the control is switched from the steering reaction force feedback control to the restraining torque proportional control so that only the restraining torque proportional control is applied.

Moreover, the additional torque Cc calculated by the steering reaction force feedback controlling unit 204 is corrected with the correction coefficient k2 which is set by the second right/left front wheel speed difference correction coefficient defining unit 205, and, in the case where the right/left front wheel speed difference is in the range of ±a, the control is switched from the restraining torque proportional control to the steering reaction force feedback control so that only the steering reaction force feedback control is applied.

The restraining torque proportional controlling unit 201 calculates the additional torque Tc which is proportional to the control amount of the restraining torque.

The first right/left front wheel speed difference correction coefficient defining unit 202 outputs the correction coefficient k1 having characteristics such as shown in FIG. 3. The correction coefficient k1 has the characteristics in which the coefficient is zero in a range where the right/left front wheel speed difference is ±a, changed from zero to +1 at a constant gradient in a range where the right/left front wheel speed difference is from +a to +b, and is +1 in a range where the right/left front wheel speed difference exceeds +b (the right/left front wheel speed difference is equal to or greater than +b, or is greater than +b), and characteristics in which the coefficient is changed from zero to −1 at the same gradient as the above-described gradient, in a range where the right/left front wheel speed difference is from −a to −b, and is −1 in a range where the right/left front wheel speed difference exceeds −b (the right/left front wheel speed difference is equal to or less than −b, or is less than −b).

The additional torque Tc calculated by the restraining torque proportional controlling unit 201 is multiplied by the first multiplication processing unit 203 with the correction coefficient k1 set by the first right/left front wheel speed difference correction coefficient defining unit 202. Thus, the additional torque Tw output from the first multiplication processing unit 203 is zero in a range where the right/left front wheel speed difference is ±a, and changed from zero to a value which is proportional to the control amount of the restraining torque, in the direction according to the right/left front wheel speed difference at a constant gradient in a range where the right/left front wheel speed difference is from +a to +b. In a range where the right/left front wheel speed difference exceeds +b (the right/left front wheel speed difference is equal to or greater than +b, or is greater than +b), furthermore, the additional torque Tw is proportional to the control amount of the restraining torque and is in the direction according to the right/left front wheel speed difference. In a range where the right/left front wheel speed difference is from −a to −b, the additional torque Tw is changed from zero to a value which is proportional to the control amount of the restraining torque, at the same gradient as the case of the range where the right/left front wheel speed difference is from +a to +b. In a range where the right/left front wheel speed difference exceeds −b (the right/left front wheel speed difference is equal to or less than −b, or is less than −b), furthermore, the additional torque Tw is proportional to the control amount of the restraining torque and is in the direction according to the right/left front wheel speed difference.

The steering reaction force feedback controlling unit 204 calculates the steering system reaction force, and calculates the additional torque Cc which cancels the reaction force.

The second right/left front wheel speed difference correction coefficient defining unit 205 sets the correction coefficient k2 having the characteristics such as shown in FIG. 4. The correction coefficient k2 is in an opposite phase relationship relative to the correction coefficient k1, and has characteristics in which the coefficient is +1 in a range where the right/left front wheel speed difference is ±a, changed from +1 to zero at a constant gradient (opposite to the gradient in the case of the range where the correction coefficient k1 is from +a to +b) in a range where the right/left front wheel speed difference is from +a to +b, and is zero in a range where the right/left front wheel speed difference exceeds +b (the right/left front wheel speed difference is equal to or greater than +b, or is greater than +b), and characteristics in which the coefficient is changed from +1 to zero at the gradient of the polarity opposite to that of the above-described gradient in the case of the range of +a to +b, in a range where the right/left front wheel speed difference is from −a to −b, and is zero in a range where the right/left front wheel speed difference exceeds −b (the right/left front wheel speed difference is equal to or less than −b, or is less than +b).

The additional torque Cc calculated by the steering reaction force feedback controlling unit 204 is multiplied by the second multiplication processing unit 206 with the correction coefficient k2 set by the second right/left front wheel speed difference correction coefficient defining unit 205. Thus, in a range where the right/left front wheel speed difference is ±a, the additional torque Ta3 output from the second multiplication processing unit 206 is an additional torque according to the steering system reaction force in the direction along which the steering system reaction force is canceled, and, in a range where the right/left front wheel speed difference is from +a to +b, changed from a value corresponding to the steering system reaction force, in accordance with the right/left front wheel speed difference, at a constant gradient, and in the direction along which the steering system reaction force is canceled, to zero. The additional torque Ta3 is zero in a range where the right/left front wheel speed difference exceeds +b (the right/left front wheel speed difference is equal to or greater than +b, or is greater than +b). In a range where the right/left front wheel speed difference is from −a to −b, the additional torque Ta3 is changed from a value corresponding to the steering system reaction force, at the gradient of the polarity opposite to that of the gradient in the case of the range where the right/left front wheel speed difference is from +a to +b, and in the direction along which the steering system reaction force is canceled, to zero. In a range where the right/left front wheel speed difference exceeds −b (the right/left front wheel speed difference is equal to or less than −b, or is less than −b), the additional torque Ta3 is zero.

The adding unit 207 performs a process of adding the additional torque Tw which is corrected with the correction coefficient k1 output from the first multiplication processing unit 203, to the additional torque Ta3 which is corrected with the correction coefficient k2 output from the second multiplication processing unit 206, with the result that, in a range where the right/left front wheel speed difference is ±a, the additional torque output from the adding unit 207 is an additional torque which corresponds to the steering system reaction force and which is in the direction along which the steering system reaction force is canceled, by the steering reaction force feedback controlling unit 204. In a range where the right/left front wheel speed difference exceeds ±b (the right/left front wheel speed difference is equal to or greater than +b, or is equal to or less than −b, or the right/left front wheel speed difference is equal to or greater than is greater than +b, or is less than −b), the additional torque output from the adding unit 207 is an additional torque which is proportional to the control amount of the restraining torque and which is in the direction according to the right/left front wheel speed difference, by the restraining torque proportional controlling unit 201. In a range where the right/left front wheel speed difference is from −a to −b, and a range where the difference is from +a to +b, the additional torque output from the adding unit 207 is an additional torque in which the ratio of: an additional torque by the steering reaction force feedback controlling unit 204 which corresponds to the steering system reaction force and which is in the direction along which the steering system reaction force is canceled; and an additional torque by the restraining torque proportional controlling unit 201 which is proportional to the control amount of the restraining torque, corresponds to the right/left front wheel speed difference. Namely, the ratio of: the additional torque by the steering reaction force feedback controlling unit 204 which corresponds to the steering system reaction force and which is in the direction along which the steering system reaction force is canceled; and the additional torque by the restraining torque proportional controlling unit 201 which is proportional to the control amount of the restraining torque is changed in accordance with the right/left front wheel speed difference.

Figure 6:
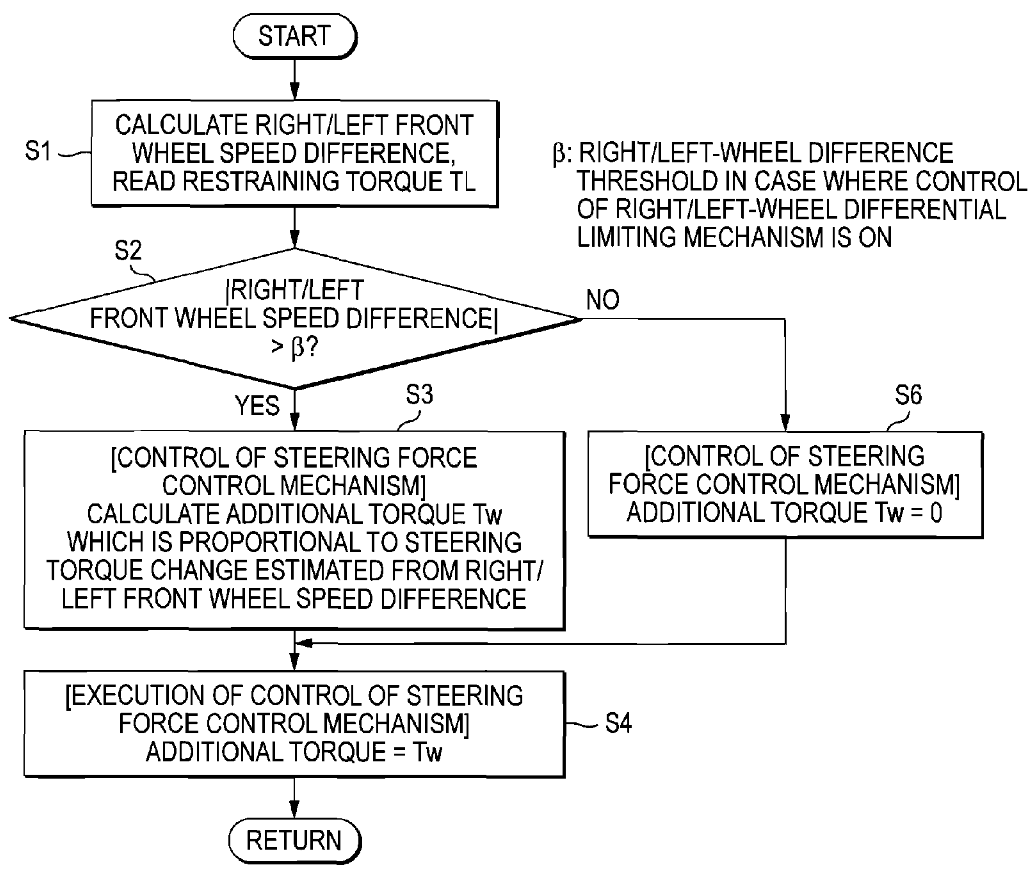
FIG. 6 is a flowchart showing an operation in the case where an example of a restraining torque proportional control which is switched in the vehicle integrated control apparatus of the first embodiment of the invention is realized by software.

FIG. 6 is a flowchart showing an operation in the case where an example of the restraining torque proportional control which is switched in the vehicle integrated control apparatus of the embodiment is realized by software.

Hereinafter, an operation when the control of the vehicle integrated control apparatus is switched to the restraining torque proportional control according to the flowchart will be described.

In the restraining torque proportional control, first, the wheel speed difference between the wheel speed (rotational speed) of the left front wheel 11 which is detected by the wheel speed sensor 61, and the wheel speed (rotational speed) of the right front wheel 12 which is detected by the wheel speed sensor 62 is calculated, and the restraining torque TL by the right/left-wheel differential limiting mechanism 81 is read from the map shown in FIG. 5B (step S1).

Then, it is determined whether the calculated wheel speed difference exceeds a right/left-wheel difference threshold ±β or not (step S2). The right/left-wheel difference threshold β is a value corresponding to ±a shown in FIG. 3. If it is determined that the calculated wheel speed difference does not exceed the right/left-wheel difference threshold ±β (the calculated wheel speed difference is equal to or less than +β or is equal to or greater than −β), an additional torque Tw which is the steering assisting force due to the electric power steering apparatus 22 is set to zero (step S6).

By contrast, if it is determined in step S2 that the calculated wheel speed difference exceeds the range of the right/left-wheel difference threshold ±β (the calculated wheel speed difference is greater than +β or less than −β), i.e., the range of ±a (greater than +a or less than −a), the process proceeds to step S3.

The steering torque change when the right/left-wheel difference is produced can be calculated as a value which is proportional to the restraining torque TL, and obtained by a calculation in which a steering torque change Tc is set as a proportional constant×the restraining torque TL. Then, the additional torque Tw which is proportional to the steering torque change Tc, and which is the steering assisting force due to the electric power steering apparatus 22 is calculated from the wheel speed difference as the correction coefficient k1×the steering torque change Tc (step S3), and an additional torque control which realizes the calculated additional torque Tw is executed (step S4). According to the embodiment, in this way, the steering torque change due to the operation of the right/left-wheel differential limiting mechanism 81 can be accurately suppressed in the state where the right/left-wheel speed difference is produced.

FIG. 7 is a flowchart showing an operation in the case where an example of the steering reaction force feedback control in the vehicle integrated control apparatus of the embodiment is realized by software. Hereinafter, an operation of the steering reaction force feedback control when the control of the vehicle integrated control apparatus is switched to the steering reaction force feedback control according to the flowchart will be described.

First, the controller 90 reads the steering torque sensor value Ts which is received from the steering ECU 71 through communication, the steering assist torque Te which is added by the control of the electric power steering apparatus 22, a vehicle speed Vb which is calculated by the controller 90, and the restraining torque TL due to the right/left-wheel differential limiting mechanism 81 (step S101). The steering torque sensor value Ts is a steering torque sensor value which is detected by the steering torque sensor 91, i.e., the steering torque which is applied by a driver's steering operation. The steering assist torque Te is a basic torque which is added by the additional torque control of the electric power steering apparatus 22. The vehicle speed Vb is calculated based on the wheel speeds which are detected by the wheel speed sensors 61 to 64, and which are input through communication with the brake system ECU 72. The restraining torque TL due to the right/left-wheel differential limiting mechanism 81 is calculated by the controller 90 based on the driving torque proportional control and the rotational speed difference proportional control.

Then, an additional torque Ta1 according to Ta0 (=Ts+Te), i.e., a steering reaction force Ta0 which is a sum of the steering torque sensor value Ts and the steering assist torque Te is controlled (step S102). In the control of the additional torque Ta1, a proportional control according to the steering reaction force Ta0 is performed to obtain the additional torque, and it is aimed that the steering reaction force Ta0 becomes zero. In order to attain effects even in the case where the driver's hands are off the steering wheel and the steering torque sensor value Ts is small, not only the proportional control but also an integral control is performed to obtain the additional torque Ta1, and it is aimed that the steering reaction force Ta0 becomes zero (step S103). That is, $Ta1=kp\times Ta0+Ki\times\int(Ta0+Ti)dt$.

The steering reaction force change due to an operation of the LSD is maximum in the case where there is a difference between the right and left wheel speeds, and its value is Tlim which is proportional to the LSD restraining torque TL. Namely, the maximum steering reaction force change amount is $Tlim=KL\times TL$ where KL is a conversion factor (step S104). Therefore, the additional torque Ta1 is limited by Tlim. When the additional torque Ta1 which is limited by Tlim is indicated by Ta2, the additional torque Ta2 at this time is $Ta2=MIN(Tlim, |Ta1|)\times sgn(Ta1)$ (step S105).

Then, a table TBL in which the relationship between the vehicle speed Vb and the gain Gv is defined so that, as the vehicle speed Vb is higher, the gain Gv is lower is referred based on the vehicle speed Vb, and the gain Gv of the additional torque control corresponding to the vehicle speed Vb is obtained (step S106). The gain Gv is multiplied with Ta2 which is obtained in step S105 to calculate an additional torque Ta3 according to the vehicle speed Vb (step S107), and the additional torque control which realizes the additional torque Ta3 that is obtained by the calculation is executed (step S108). According to the embodiment, as described above, there is an effect that it is possible to provide a steering force control apparatus in which, in the function in which priority is placed on the rough-road traveling performance and the LSD restraining force is previously increased, in a state where the right and left wheels are directly coupled with each other under the situation where the right/left-wheel speed difference converges in μ-split starting on a rough road or after slipping, the steering reaction force is reduced, but a large steering reaction force change can be suppressed, and the traveling performance and the stability are compatible.

According to the embodiment, as described above, the range where the right/left front wheel speed difference is produced and that where the right/left front wheel speed difference is not produced are defined by the threshold, and the ratio of the proportional steering assisting force due to the restraining torque proportional control, and the reaction force cancellation steering assisting force due to the steering reaction force feedback control is changed depending on to which one of the ranges the detected right/left front wheel speed difference belongs.

Figure 13:
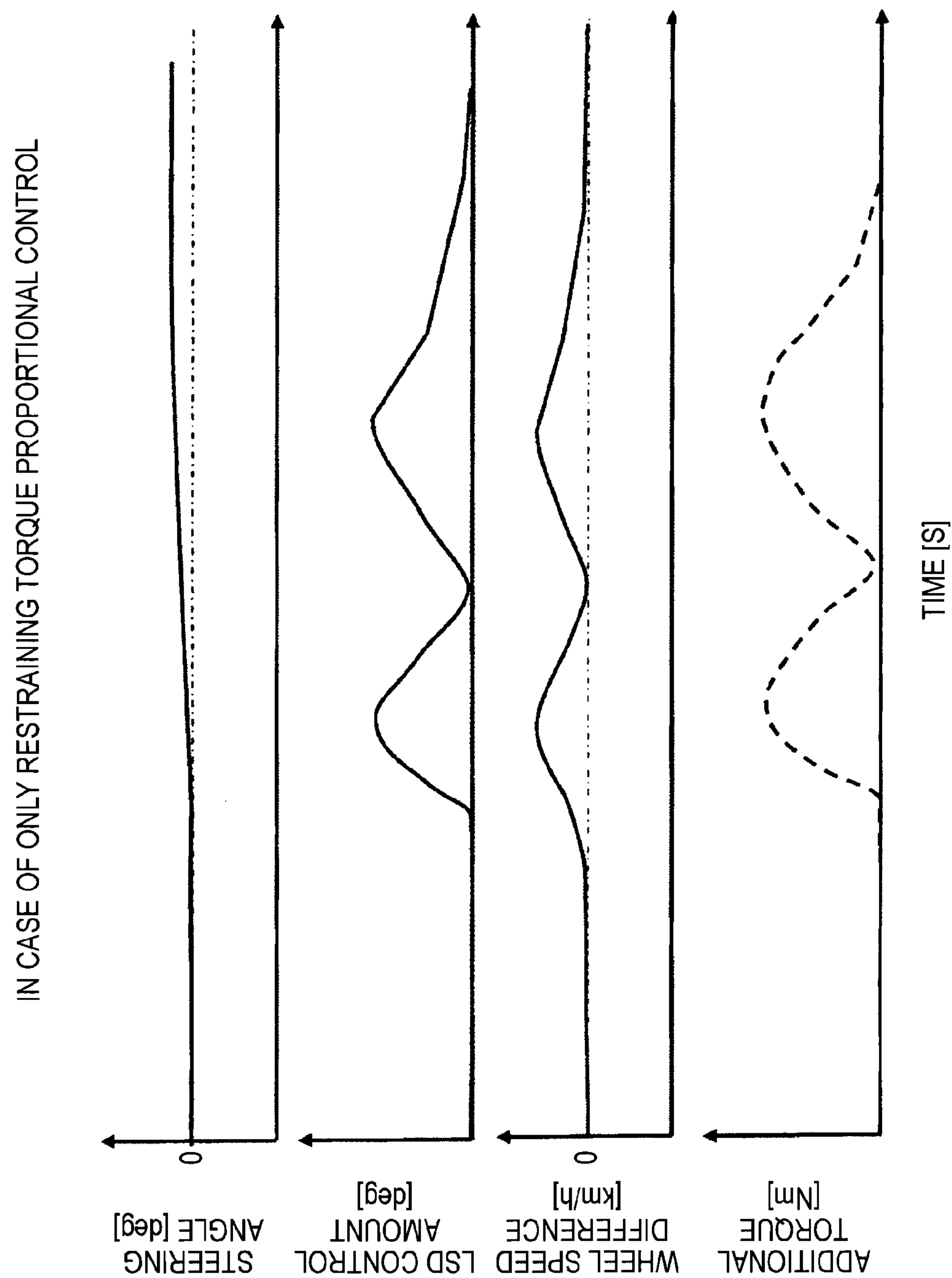
FIG. 13 is a diagram showing an additional torque in the case where only the restraining torque proportional control is performed in a vehicle integrated control apparatus of the first embodiment of the invention.
Figure 14:
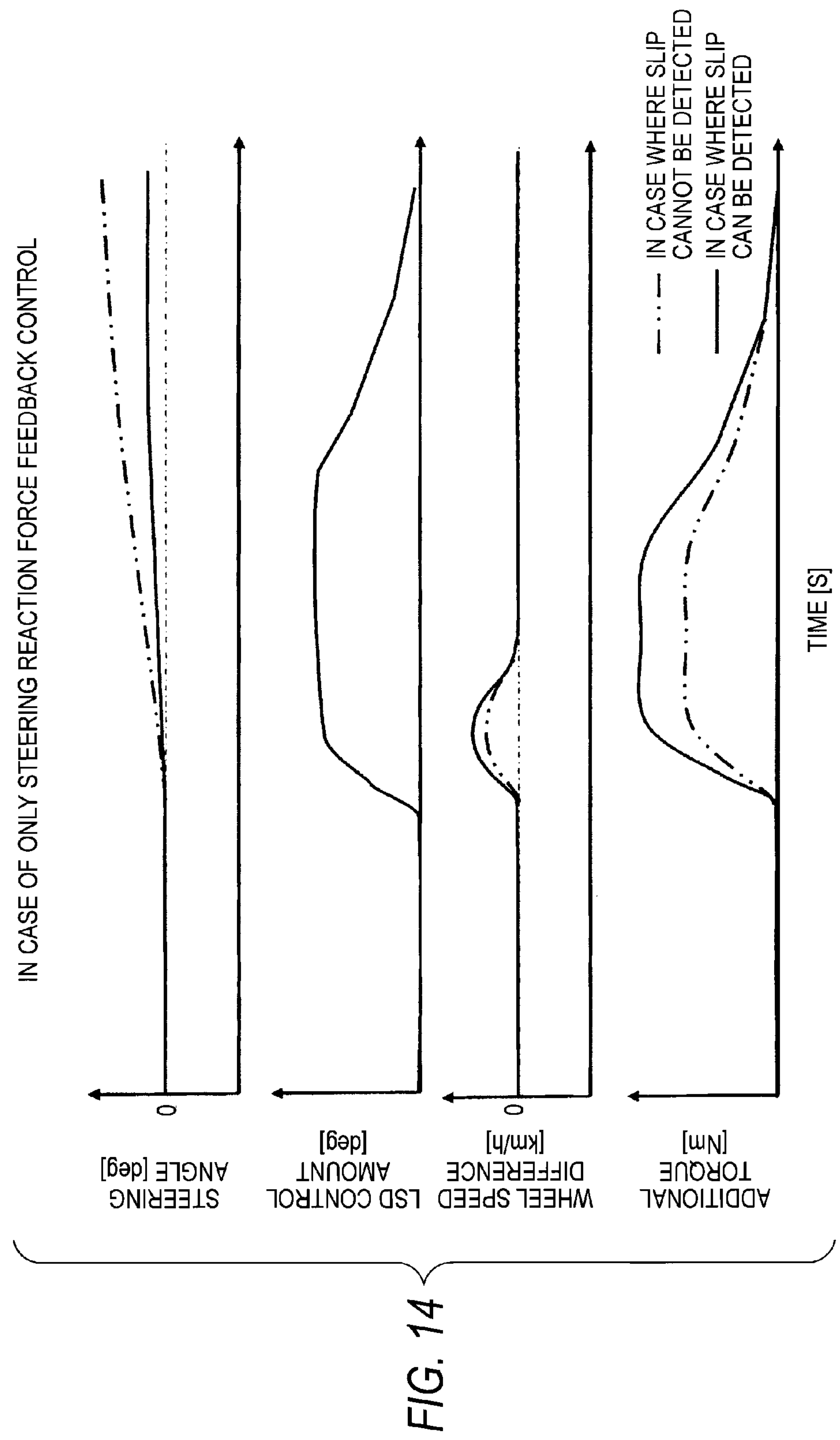
FIG. 14 is a diagram showing an additional torque in the case where only the steering reaction force feedback control is performed in the vehicle integrated control apparatus of the first embodiment of the invention.
Figure 15:
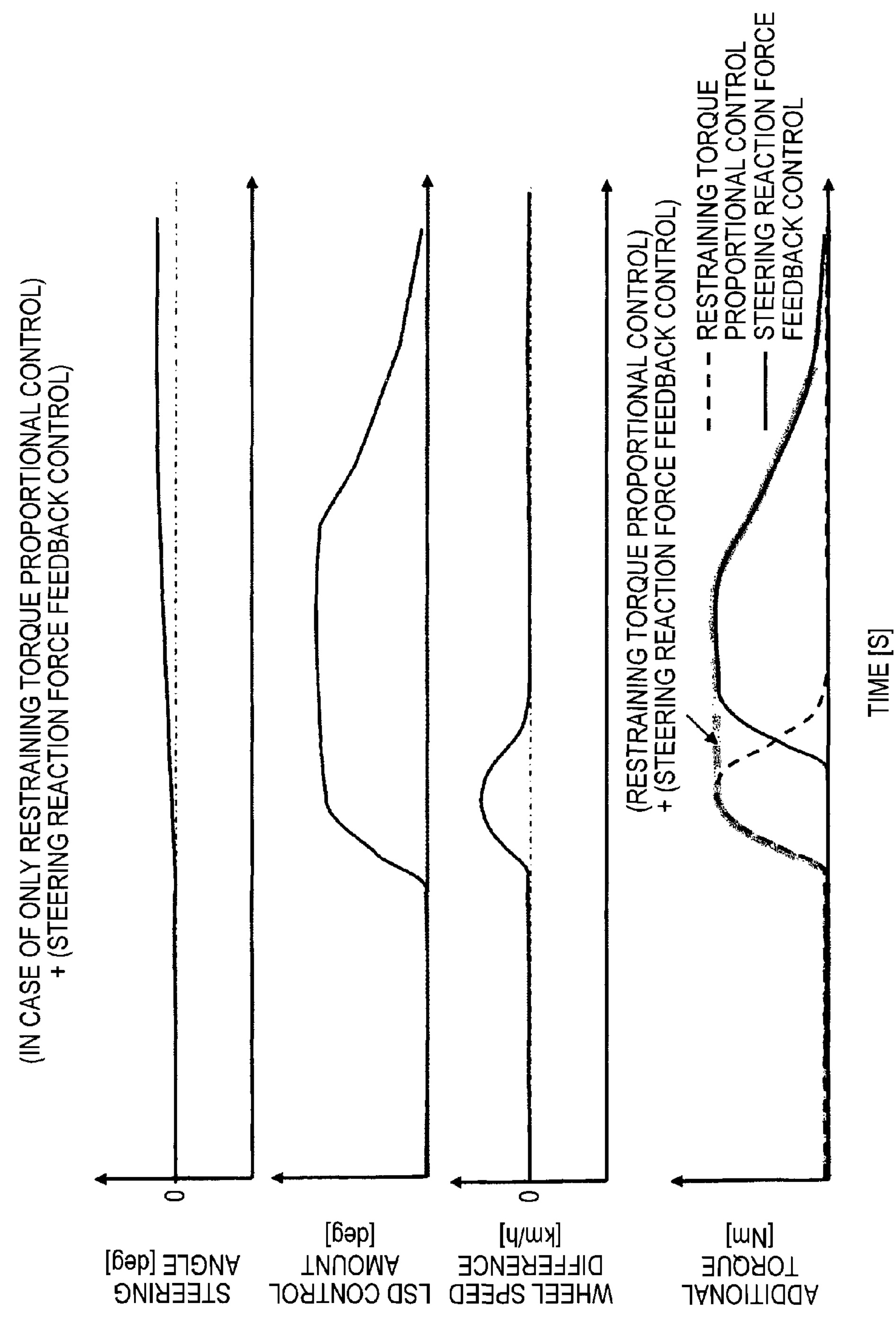
FIG. 15 is a diagram showing an additional torque in the case where both the restraining torque proportional control and the steering reaction force feedback control function in the vehicle integrated control apparatus of the first embodiment of the invention.

FIG. 13 is a diagram showing the additional torque in the case where only the restraining torque proportional control is performed in the vehicle integrated control apparatus. FIG. 14 is a diagram showing the additional torque in the case where only the steering reaction force feedback control is performed in the vehicle integrated control apparatus. FIG. 15 is a diagram showing the additional torque in the case where both the restraining torque proportional control and the steering reaction force feedback control function in the vehicle integrated control apparatus. When both the restraining torque proportional control and the steering reaction force feedback control function, there is an effect that it is possible to provide a vehicle integrated control apparatus in which a steering torque change due to an operation of the right/left-wheel differential limiting mechanism is accurately suppressed, the driver's feeling of strangeness during a steering operation is eliminated, and powerful starting is safely realized even on a slippery road surface.

In the case of only the restraining torque proportional control, when the right and left wheels are directly coupled with each other, as shown in FIG. 13, namely, the direction of the driving force difference between the front wheels cannot be determined, and the direction in which the steering assisting force is to be added cannot be determined. Therefore, the restraining torque TL is only a restraining torque due to the rotational speed difference proportional control, and the right and left wheels must be prevented from being directly coupled with each other. When the wheel speed difference is eliminated, consequently, also the restraining torque TL is reduced, and therefore the starting performance is lowered.

In the case of only the steering reaction force feedback control, as shown in FIG. 14, the restraining torque TL is an restraining torque due to the driving torque proportional control in addition to a restraining torque due to the rotational speed difference proportional control, and, even when the wheel speed difference is eliminated, the restraining torque TL is not reduced, and the starting performance can be ensured. However, the steering reaction force feeling is lowered, and hence the feeling of strangeness is produced. In practice, the steering reaction force in starting on a normal road surface must be prevented from being reduced, and a process of detecting a wheel slip and switching the integration gain Ki depending on whether a slip is detected or not must be performed. In the case where the slip detection does not operate in μ-split on a rough road or the like, however, the starting performance may be sometimes lowered.

In the case where both the restraining torque proportional control and the steering reaction force feedback control function, when an initial wheel slip occurs, as shown in FIG. 15, torque steer is suppressed by the restraining torque proportional control without producing a feeling of strangeness in steering. After the wheel is locked by the LSD restraint, the steering reaction force feedback control functions, so that the reduction of the steering reaction force is suppressed to the minimum, and the starting performance is ensured.

According to the embodiment, when the control is switched to the restraining torque proportional control, the proportional steering assisting force which is proportional to the driving force difference between the right and left front wheels is added to the steering torque of the electric power steering apparatus, and a steering torque change due to the operation of the right/left-wheel differential limiting mechanism 81 can be accurately suppressed.

According to the embodiment, moreover, there is no limitation such as that the restraining torque TL is limited to the restraining torque due to the rotational speed difference proportional control. Therefore, torque steer on a slippery road surface can be suppressed without sacrificing the starting performance, and the feeling of strangeness in steering is small. Moreover, starting without the feeling of strangeness in steering is realized also on a normal road surface.

In a vehicle on which an LSD (Limited Slip Differential) that is a mechanism for suppressing idling of either one of the right and left wheels is mounted in order to improve the starting performance and the accelerating performance on a μ-split road surface, the steering becomes largely uncontrollable in μ-split starting as compared with a vehicle on which an LSD is not mounted. When the embodiment is applied to such a vehicle mounted on which an LSD is mounted, there is an effect that the starting/accelerating performance on a μ-split road and the stability of the vehicle are compatible.

Second Embodiment

The first embodiment is configured so that the additional torque due to the restraining torque proportional control is corrected with the correction coefficient set by the first right/left front wheel speed difference correction coefficient defining unit 202, and the additional torque due to the steering reaction force feedback control is corrected with the correction coefficient set by the second right/left front wheel speed difference correction coefficient defining unit 205. In the present embodiment, the ratio of: the additional torque which is the reaction force cancellation steering assisting force due to the restraining torque proportional control; and the additional torque which is the reaction force cancellation steering assisting force due to the steering reaction force feedback control is switched by using a switching coefficient k in place of the correction coefficient.

Figure 8:
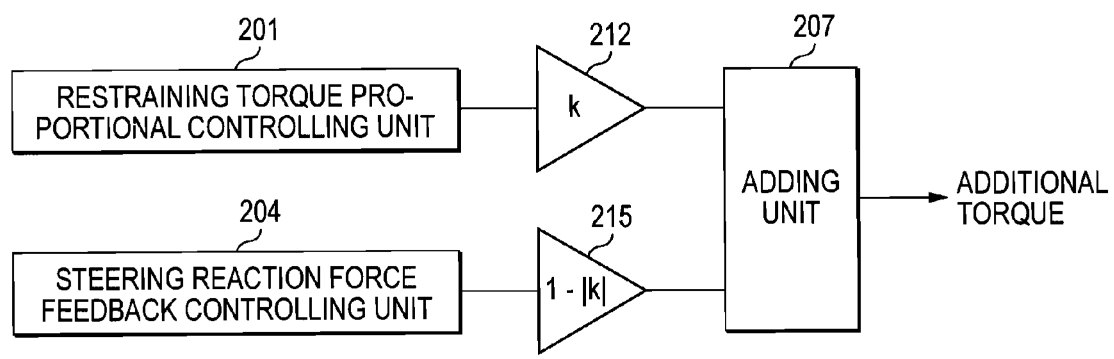
FIG. 8 is a block diagram showing the configuration of a vehicle integrated control apparatus of a second embodiment of the invention.

FIG. 8 is a block diagram showing the configuration of a vehicle integrated control apparatus of the embodiment. In FIG. 8, components which are identical with or equivalent to those of FIG. 2 are denoted by the same reference numerals, and their description is omitted.

In the embodiment, a first weighting unit 212 which performs weighting with the switching coefficient k, and a second weighting unit 215 which performs weighting with a switching coefficient $(1-|k|)$ are used, the additional torque due to the restraining torque proportional control is weighted by the first weighting unit 212 with the switching coefficient k, and that due to the steering reaction force feedback control is weighted by the second weighting unit 215 with the switching coefficient (1−|k|).

In the case where the right/left front wheel differential rotation≧0, the switching coefficient k is set to 0≦k=(right/left front wheel differential rotation−a)/(b−a)≦1.

In the case where the right/left front wheel differential rotation<0, the switching coefficient k is set to −1≦k=(right/left front wheel differential rotation+a)/(b−a)≦0.

In the above inequalities, a is the right/left front wheel differential rotation before starting of the switching, b is the right/left front wheel differential rotation before ending of the switching, b−a is a switch wrapping region, and 0<a<b.

Alternatively, a and b may be constant values or variables according to the restraining torque or a differential value of the differential rotation of the right and left front wheels by using the maps shown in FIGS. 9 to 12.

Figure 9:
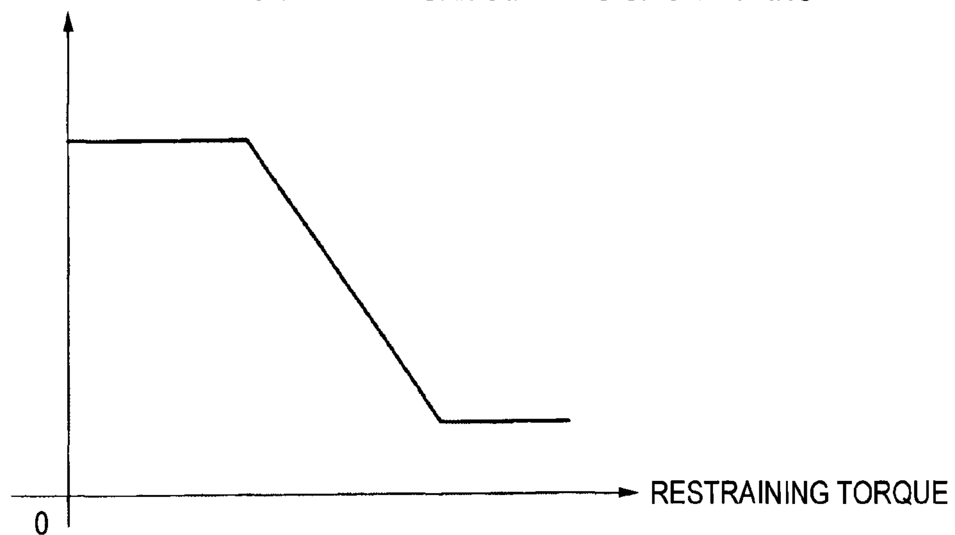
FIG. 9 is a view illustrating a variable map according to a restraining torque in the vehicle integrated control apparatus of the second embodiment of the invention.
Figure 10:
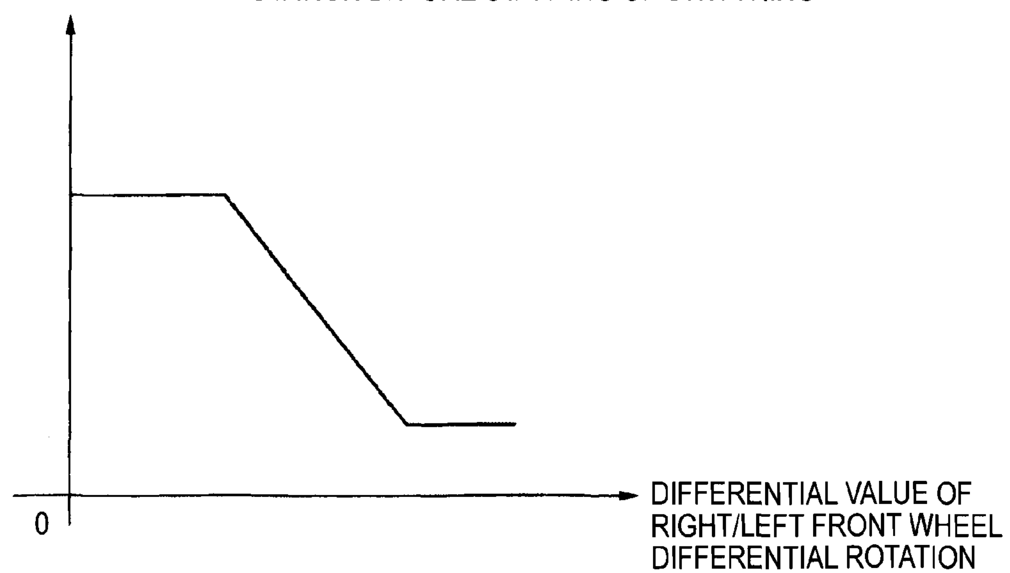
FIG. 10 is a view illustrating a variable map according to a differential value of the differential rotation of the right and left front wheels in the vehicle integrated control apparatus of the second embodiment of the invention.
Figure 11:
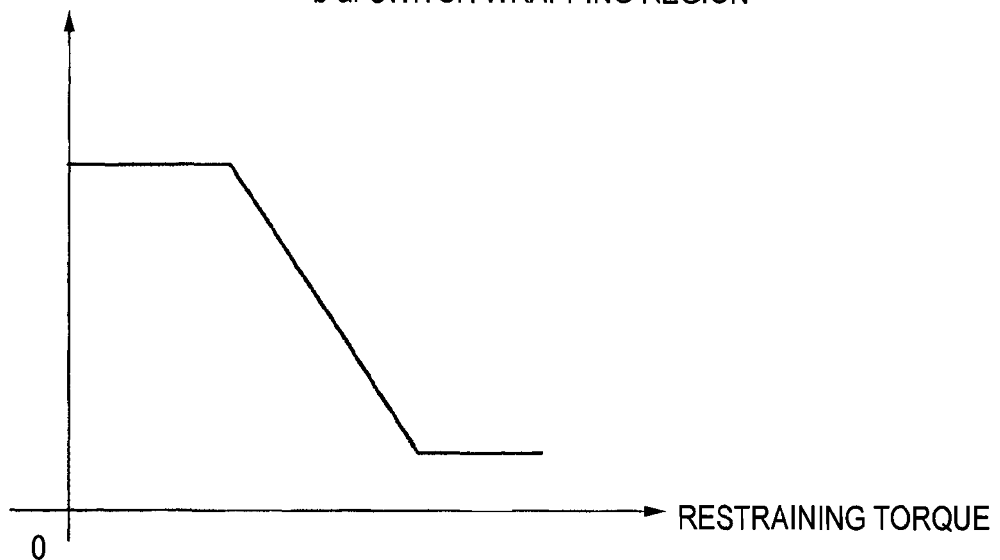
FIG. 11 is a view illustrating a variable map according to a restraining torque in a switch wrapping region in the vehicle integrated control apparatus of the second embodiment of the invention.
Figure 12:
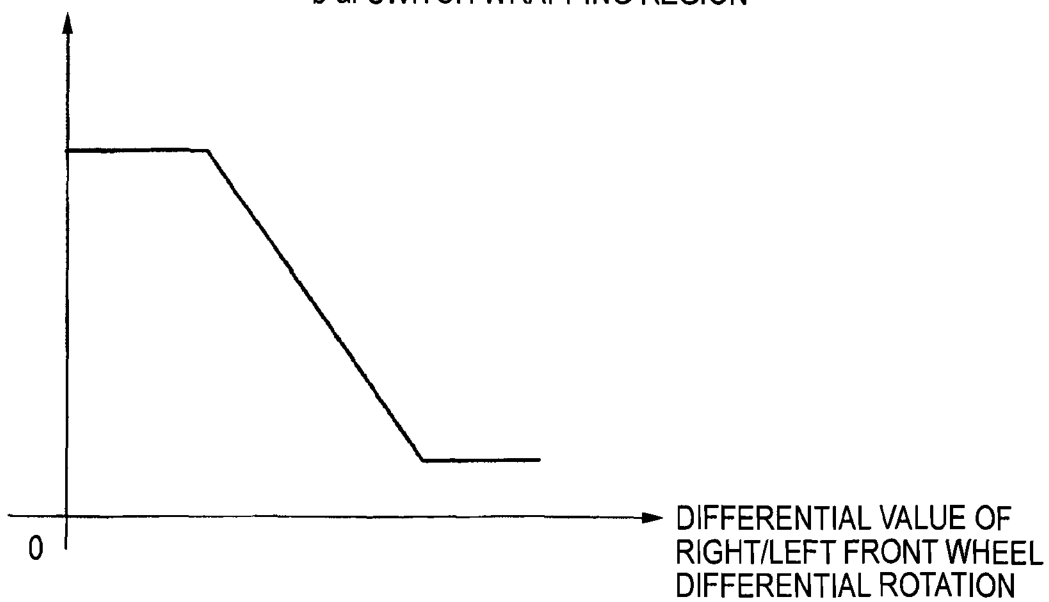
FIG. 12 is a view illustrating a variable map according to a differential value of the differential rotation of the right and left front wheels in the switch wrapping region in the vehicle integrated control apparatus of the second embodiment of the invention.

FIG. 9 is a view illustrating a variable map according to the restraining torque, FIG. 10 is a view illustrating a variable map according to a differential value of the right/left front wheel differential rotation, FIG. 11 is a view illustrating a variable map according to the restraining torque in the switch wrapping region, and FIG. 12 is a view illustrating a variable map according to a differential value of the right/left front wheel differential rotation in the switch wrapping region.

According to the embodiment, effects similar to those of the first embodiment are achieved.

According to an aspect of the invention, the restraining torque proportional controlling unit causes the steering force controlling mechanism to output the proportional steering assisting force which is proportional to the control amount of the restraining torque of the electronic control type right/left-wheel differential limiting mechanism, so as to be added as the steering assisting force in a direction according to the rotational speed difference between the right and left front wheels detected by the wheel speed difference detecting unit, the steering reaction force feedback controlling unit calculates the steering system reaction force, and causes the steering force controlling mechanism to output the reaction force cancellation steering assisting force which cancels the steering system reaction force, so as to be added as the steering assisting force in a direction along which the steering system reaction force is canceled, and, in the steering assisting force, the ratio of the proportional steering assisting force and the reaction force cancellation steering assisting force is switched by the switching unit in accordance with the rotational speed difference between the right and left front wheels. Therefore, a vehicle integrated control apparatus can be provided which can accurately suppress a steering torque change due to an operation of the right/left-wheel differential limiting mechanism, which can eliminate the driver's feeling of strangeness in the steering force controlling mechanism during a steering operation, and which can safely realize powerful starting even on a slippery road surface. Moreover, torque steer can be suppressed without imposing restrictions on the electronic control type right/left-wheel differential limiting mechanism.

According to an aspect of the invention, the correction coefficient which corrects the proportional steering assisting force output from the restraining torque proportional controlling unit is defined by the first correction coefficient defining unit with respect to the rotational speed difference between the right and left front wheels, the correction coefficient which corrects the reaction force cancellation steering assisting force output from the steering reaction force feedback controlling unit is defined by the second correction coefficient defining unit with respect to the rotational speed difference between the right and left front wheels with the characteristics in which the correction coefficient is in an opposite phase relationship relative to the correction coefficient defined by the first correction coefficient defining unit, the proportional steering assisting force output from the restraining torque proportional controlling unit is corrected by the first correcting unit with the correction coefficient defined by the first correction coefficient defining unit, the reaction force cancellation steering assisting force output from the steering reaction force feedback controlling unit is corrected by the second correcting unit with the correction coefficient defined by the second correction coefficient defining unit, and the proportional steering assisting force corrected by the first correcting unit, and the reaction force cancellation steering assisting force corrected by the second correcting unit are added to each other, and output by the adding unit as the steering assisting force which is to be added by the steering force controlling mechanism. Therefore, it is possible to achieve an effect that a vehicle integrated control apparatus can be provided which can switch the ratio of the proportional steering assisting force and the reaction force cancellation steering assisting force in accordance with the rotational speed difference between the right and left front wheels, which can accurately suppress a steering torque change due to an operation of the right/left-wheel differential limiting mechanism, which can eliminate the driver's feeling of strangeness in the steering force controlling mechanism during a steering operation, and which can safely realize powerful starting even on a slippery road surface.

What is claimed is:

1. A vehicle integrated control apparatus comprising:

an electrically controlled right/left wheel differential limiting mechanism configured to electrically control a restraining torque of right and left front wheels;

a wheel speed difference detecting unit configured to detect a rotational speed difference between the right and left front wheels;

a restraining torque proportional controlling unit configured to calculate a first steering assisting force that is proportional to a control amount of the restraining torque of the right/left-wheel differential limiting mechanism and that is in a direction according to the rotational speed difference between the right and left front wheels detected by the wheel speed difference detecting unit;

a steering reaction force feedback controlling unit configured to calculate a second steering assisting force that corresponds to a steering system reaction force and that is in a direction along which the steering system reaction force is canceled;

a steering force controlling mechanism configured to generate a steering assisting force including the first steering assisting force and the second steering assisting force, the steering assisting force aiding a steering torque of a power steering apparatus caused by a steering operation by a driver; and a switching unit configured to change a ratio of the first steering assisting force and the second steering assisting force in the steering assisting force, in accordance with the rotational speed difference between the right and left front wheels.

2. The vehicle integrated control apparatus according to claim 1, wherein the switching unit includes:

a first correction coefficient defining unit configured to set a correction coefficient for correcting the first steering assisting force based on the rotational speed difference between the right and left front wheels;

a second correction coefficient defining unit configured to set a correction coefficient for correcting the second steering assisting force, characteristics of which are in an opposite phase relationship relative to those of the correction coefficient set by the first correction coefficient defining unit, based on the rotational speed difference between the right and left front wheels;

a first correcting unit configured to correct the first steering assisting force with the correction coefficient set by the first correction coefficient defining unit;

a second correcting unit configured to correct the second steering assisting force with the correction coefficient set by the second correction coefficient defining unit; and an adding unit configured to add the first steering assisting force corrected by the first correcting unit, to the second steering assisting force corrected by the second correcting unit to output to the steering force controlling mechanism.

3. The vehicle integrated control apparatus according to claim 2, wherein, in a case where the rotational speed difference between the right and left front wheels is equal to or less than a first value, the correction coefficient set by the first correction coefficient defining unit is set to zero, and, in a case where the rotational speed difference between the right and left front wheels is equal to or greater than a second value, the correction coefficient set by the second correction coefficient defining unit is set to zero.

4. The vehicle integrated control apparatus according to claim 2, wherein the correction coefficient set by the first correction coefficient defining unit is changed from zero to 1 or −1 in a range where the rotational speed difference between the right and left front wheels is from a first value to a second value.

5. The vehicle integrated control apparatus according to claim 2, wherein the correction coefficient set by the second correction coefficient defining unit is changed from 1 to zero in a range where the rotational speed difference between the right and left front wheels is from a first value to a second value.

6. The vehicle integrated control apparatus according to claim 1, wherein the restraining torque is determined based on a first map indicative of a restraining torque which is proportional to a driving torque of an engine, and a second map indicative of a restraining torque which is proportional to the rotational speed difference between the right and left front wheels.

7. The vehicle integrated control apparatus according to claim 1, wherein the second steering assisting force is obtained by a proportional control and an integral control which are performed on a total value of a steering torque due to an operation of a steering unit by a driver, and a steering assist torque which is imparted to the operation of the steering unit.

8. The vehicle integrated control apparatus according to claim 1, wherein the switching unit includes a weighting unit configured to perform weighting with a switching coefficient on the ratio of the first steering assisting force and the second steering assisting force in the steering assisting force.

* * * * *